(12) United States Patent
Arnold

(10) Patent No.: US 8,491,005 B2
(45) Date of Patent: Jul. 23, 2013

(54) THRUST NEUTRAL INFLATOR ASSEMBLY

(75) Inventor: David R Arnold, Macomb, MI (US)

(73) Assignee: Key Safety Systems, Inc, Sterling Heights, MI (US)

( * ) Notice: Subject to any disclaimer, the term of this patent is extended or adjusted under 35 U.S.C. 154(b) by 0 days.

(21) Appl. No.: 13/292,567

(22) Filed: Nov. 9, 2011

(65) Prior Publication Data

US 2013/0112102 A1 May 9, 2013

(51) Int. Cl.
*B60R 21/26* (2011.01)

(52) U.S. Cl.
USPC ........... 280/740; 280/736; 280/737; 280/742; 102/530

(58) Field of Classification Search
USPC .......... 280/736, 737, 741, 740, 742; 102/530, 102/531
See application file for complete search history.

(56) References Cited

U.S. PATENT DOCUMENTS

| | | | | |
|---|---|---|---|---|
| 3,813,007 | A * | 5/1974 | Doin et al. | 222/4 |
| 5,642,903 | A * | 7/1997 | Headley | 280/737 |
| 5,738,372 | A * | 4/1998 | Lowe et al. | 280/736 |
| 7,434,836 | B2 | 10/2008 | Leiffheit | |
| 7,520,531 | B2 * | 4/2009 | Gammill | 280/737 |
| 7,530,598 | B2 | 5/2009 | Fischer | |
| 7,654,566 | B2 * | 2/2010 | Huber et al. | 280/736 |
| 7,658,406 | B2 * | 2/2010 | Townsend et al. | 280/737 |
| 7,938,443 | B1 | 5/2011 | Smith | |
| 8,052,169 | B2 * | 11/2011 | Yano et al. | 280/737 |
| 2003/0197357 | A1 * | 10/2003 | Heigl et al. | 280/736 |
| 2004/0130133 | A1 * | 7/2004 | Yamazaki et al. | 280/737 |
| 2006/0261582 | A1 * | 11/2006 | Fischer et al. | 280/736 |
| 2006/2615830 | | 11/2006 | Debler | |

FOREIGN PATENT DOCUMENTS

| | | |
|---|---|---|
| JP | 2008094244 A | 4/2008 |
| WO | 2006120970 A1 | 11/2006 |

\* cited by examiner

*Primary Examiner* — Joseph Rocca
*Assistant Examiner* — Darlene P Condra
(74) *Attorney, Agent, or Firm* — Markell Seitzman; David King

(57) ABSTRACT

An inflator for producing inflation gas from a propellant has a housing for storing the propellant, a diffuser for attachment to the inflator housing and a sealing member. The diffuser has one or more open passages for passing inflation gas upon ignition of the propellant and a plurality of sealed passages oriented opposite to the one or more open passages. The sealing member covers the sealed passages. The sealing member is consumed when exposed to an open flame thereby opening the sealed passages to vent inflation gases opposite the opposed one or more open passages to create a thrust neutral exhaust upon an inadvertent ignition of the propellant due to exposure to fire.

15 Claims, 6 Drawing Sheets

US 8,491,005 B2

THRUST NEUTRAL INFLATOR ASSEMBLY

FIELD OF THE INVENTION

This invention relates to an inflator assembly particularly a propellant filled inflator assembly with a diffuser or endcap attached that provides a safer shipping and storage feature in the event of a fire.

BACKGROUND OF THE INVENTION

Inflation of a typical airbag cushion in a vehicle is achieved by igniting a propellant stored in an inflator. Once ignited, the propellant rapidly generates large volumes of gas which fill the airbag inflating the cushion to protect the vehicle occupants. These devices are credited for saving numerous lives in the event of a vehicle crash.

During the manufacture of these propellant filled inflators, special care is used to insure proper handling and safety precautions are followed to avoid inadvertent ignition of the propellant.

Once assembled, the inflators laden with propellant are moved to an assembly location wherein the inflator can be placed in a module housing along with the airbag cushion. In the case of a side curtain airbag, the inflator may be attached to a fill tube connected to a curtain airbag or directly to the cushion. Alternatively, the inflators could be boxed and stored for later assembly or shipment. In any event, large numbers of the inflators are routinely shipped and transported to vehicle assembly plants.

It is during storage and transportation that these propellant filled inflators can pose a risk in the event of an inadvertent ignition. The situation is generally remote, but in the event of a fire in shipping or storage, the propellant could be ignited causing a release of gases which could cause a condition of high thrust making the unrestrained inflator a projectile or missile causing a risk to personnel standing nearby or those trying to put out the fire.

As a result of this risk, the United States Department of Transportation requires inflators to be subjected to a bonfire test wherein the inflator when placed directly in a fire cannot become a projectile upon ignition of the stored propellant.

To pass this test, inflator manufacturers have devised ways to balance the exhausting gases to create a "thrust neutral" or "zero thrust" inflator.

In U.S. Pat. No. 7,938,443 B a patent entitled "Shipping Safe Inflator For An Airbag Module" discloses a distal end portion of an inflator with a thrust balancing feature having a plurality of elongated secondary apertures with deflection vanes open to exhaust the gases in a thrust balance configuration. This distal end can discharge gases exiting along the axis through the primary discharge opening and the elongated secondary passages redirect part of the flow longitudinally aft oppositely directed to cancel thrust and has a plurality of radially oriented openings to exhaust more of the gas radially in such a fashion the inflator has no thrust capability due to inadvertent ignition.

Others have simply designed inflators with a plurality of holes radially around the circumference of a housing to create a thrust neutral inflator. This technique is most simple and easy to employ in passenger side inflators and other applications wherein the inflator is stored in a housing assembly.

In side curtain airbags, the inflator is generally not in a module housing, but is secured directly onto the vehicle along with the airbag curtain connected via a hose or tubing assembly. In this case, the inflator needed to be designed in such a way that the propellant gases are captured to fill the curtain.

Ideally the gases are not lost or vented to atmosphere to achieve a thrust neutral condition when in use. This is true because to vent large amounts of the inflation gases means even more propellant must be used so the remaining captured gases are sufficient to fill the airbag. Accordingly, to insure the inflator achieves a thrust neutral balanced exhaust when exposed to fire during shipping and storage, but when assembled for normal use this safety feature does not waste the inflation gases a new a superior way to manufacture a thrust neutral inflator assembly is needed. Preferably, the new way is accomplished in a cost efficient and very reliable way. These and other beneficial objectives are satisfied by the present inventive design described herein.

SUMMARY OF THE INVENTION

An inflator 30 for producing inflation gas from a propellant 31 has a housing for storing the propellant 31, a diffuser 10 for attachment to the inflator 30 housing and a sealing member 20. The diffuser 10 has one or more open passages 14 for passing inflation gas upon ignition of the propellant 31 and a plurality of sealed passages 12 oriented opposite to the one or more open passages 14. The sealing member 20 covers the sealed passages 12. The sealing member 20 is consumed when exposed to an open flame thereby opening the sealed passages 12 to vent inflation gases opposite the opposed one or more open passages 14 to create a thrust neutral exhaust upon an inadvertent ignition of the propellant 31 due to exposure to fire. The plurality of sealed passages 12 have an area relative to the area of the opposed one or more open passages 14 of the diffuser 10 balanced in size to ensure thrust neutrality. The sealed passages 12 are four or more openings in the diffuser 10. The sealed openings 12 are one of circular, square, rectangular, triangular holes or rectangular slots or any combination of these shapes covered by the sealing member 20.

The sealing member 20 is preferably made of a thermo plastic or elastomeric material. The material from which the sealing member 20 is made is consumed by exposure to flame.

The diffuser 10 is made of metal. The diffuser 10 has an inlet portion of circular cross section 15 having an open inflation channel 1 and the sealing member 20 is attached internally along an arcuate segment of an internal surface 11 of the diffuser 10. The sealing member 20 has a yield strength, an ultimate strength and a percent elongation set to exceed the inflation pressure and temperatures of the ignited inflator 30 in normal use of inflating an airbag. The sealing member 20 when assembled into the diffuser preferably has at a minimum a yield strength of 33 MPa, ultimate strength of 35 MPa and percent elongation of 50 percent. The sealing member 20 can withstand the maximum inflation pressure and maximum temperature generated by the normally ignited inflator 30 without losing seal integrity in the absence of exposure to external flames or fire related temperatures which are adapted to consume the sealing member 20 exposing the sealed passages 12. The sealing member 20 when assembled into the diffuser 10 preferably can withstand 2600 psi at 90 degrees C. The sealing member 20 material can be DELRIN 100 NC010, an acetal material.

The sealing member 20 has a plurality of short cylindrical projections 21 adapted to plug the sealed passages 12; and wherein two or more of the projections 21 are used to secure the sealing member 20 to the diffuser 10. Preferably, the two or more projections 21 extending through the openings 12 of the diffuser 10 are heat staked or ultrasonically welded 23 onto the diffuser 10 to secure the sealing member 20.

BRIEF DESCRIPTION OF THE DRAWINGS

The invention will be described by way of example and with reference to the accompanying drawings in which.

DETAILED DESCRIPTION OF THE INVENTION

Figure 1:
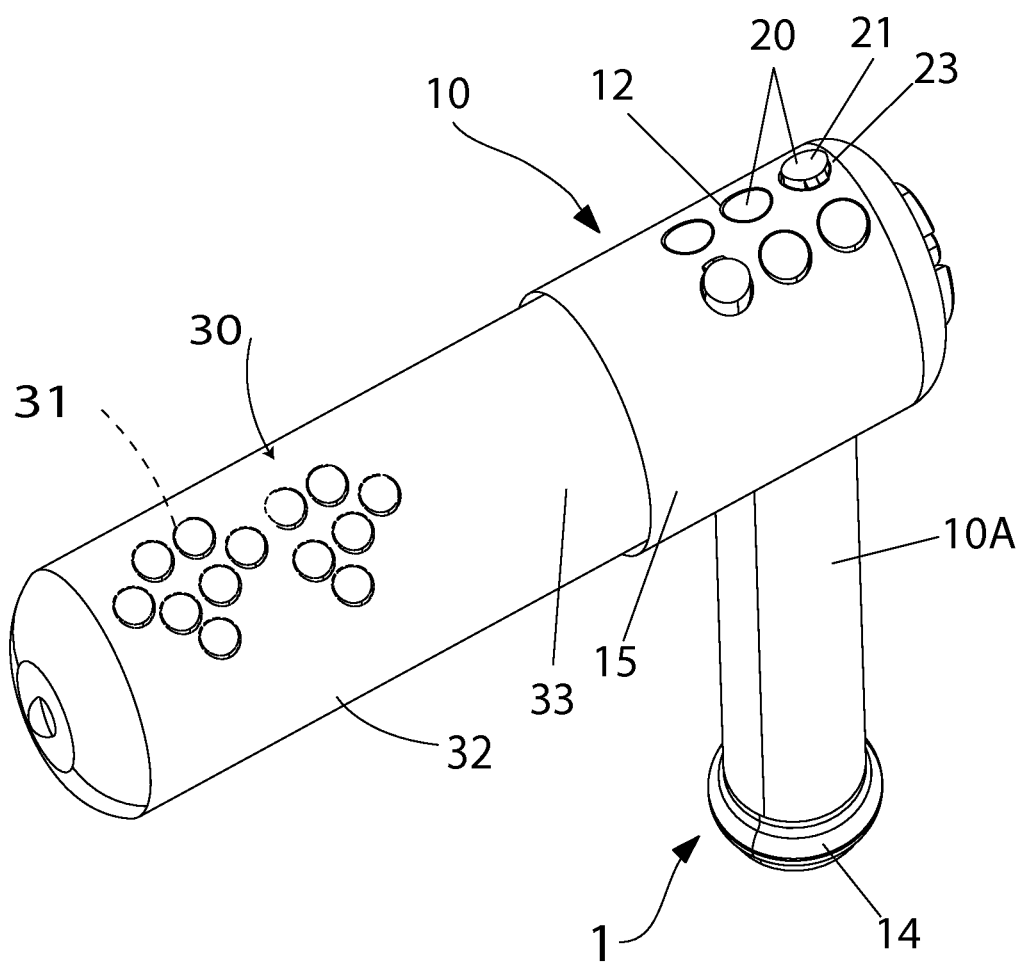
FIG. 1 is a perspective view of the inflator with a thrust neutral diffuser according to the present invention with a plurality of sealed passages sealed by a sealing member.

With reference to FIG. 1, an inflator 30 is shown with a diffuser 10 attached to a discharge end 33 of the inflator 30. The inflator 30 has a longitudinal shaped housing 32 inside of which is stored a solid propellant 31 for generation of inflation gases for filling an airbag cushion. The propellant 31 is ignited by an ignition device (not shown) that can be activated in the event of a vehicle crash. The overall structure of the inflator 30 can be of any style or shape as long as it has a discharge end 33 to which the diffuser 10 can be securely attached.

As shown, the diffuser 10 has a cylindrical inlet end 15 which surrounds and is secured onto the discharge end 33 of the inflator 30. Once assembled, the inflator 30 and diffuser 10 become one assembly.

Figure 2:
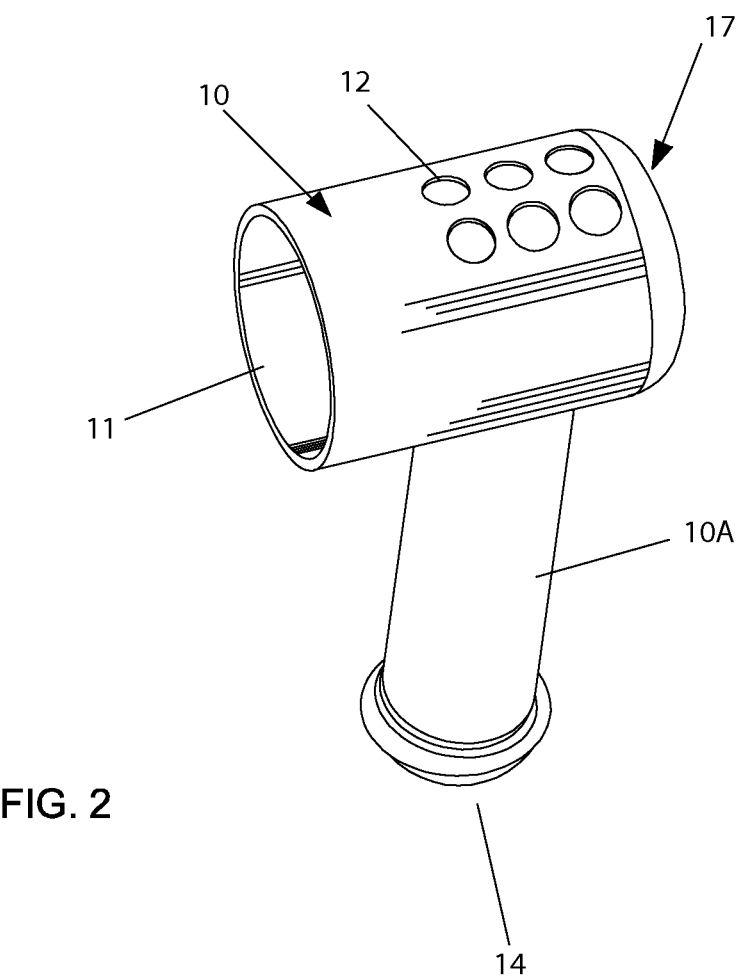
FIG. 2 is a perspective view of the igniter delay cartridge device of the present invention.

As illustrated in FIG. 2, the diffuser 10 has a plurality of passages or holes 12. As shown, the holes 12 are circular openings. Alternatively, the passages or openings 12 can be configured square, triangular, rectangular holes or open slots or any combination of these. Along a 180 degree opposite orientation to the plurality of openings 12 is shown a cylindrical discharge portion 10A of the diffuser 10. This discharge portion 10A has an opening or passageway 14 which is orthogonal to an axis of the inflator 30 and upon ignition of the propellant 31; the generated gases are directed into the inlet end 15 of the diffuser 10 along an inlet channel 1 and turned along the passageway 14 which is connected to a tube airbag assembly or directly on an airbag to inflate it.

Figure 3:
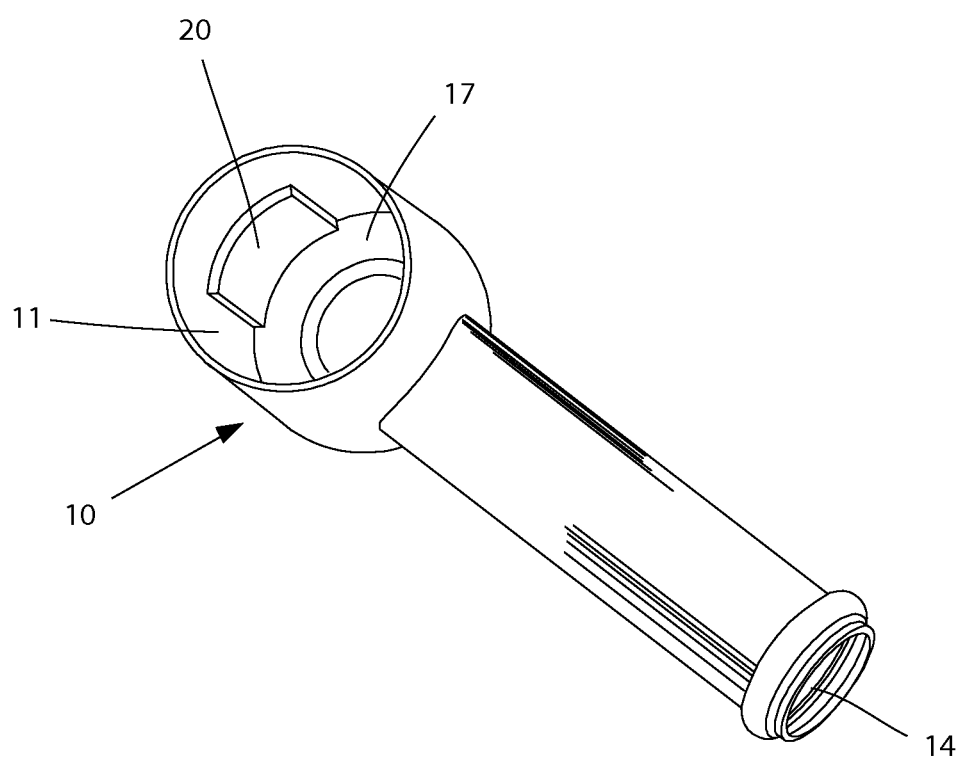
FIG. 3 is a perspective view of the diffuser showing the sealing member attached to the internal surface of the diffuser.

As shown in FIGS. 1 and 3, the plurality of openings 12 are closed and sealed by a sealing member 20. This sealing member 20 is designed to keep the openings 12 sealed even under normal ignition of the inflator 30. In this way all the generated inflation gases are directed to fill the airbag cushion and virtually none of these gases are lost to atmosphere. This feature enables the inflator 30 to be filled with only the necessary amount of propellant 31 needed to fill the cushion. The sealing member 20 as shown in FIG. 3 is arcuately shaped and closely seals itself along the interior surface 11 of the diffuser 10. As shown in FIG. 3, the diffuser 10 has a closed end 17. Accordingly, this forces the inflation gases to turn in the direction of passage 14.

Figure 4:
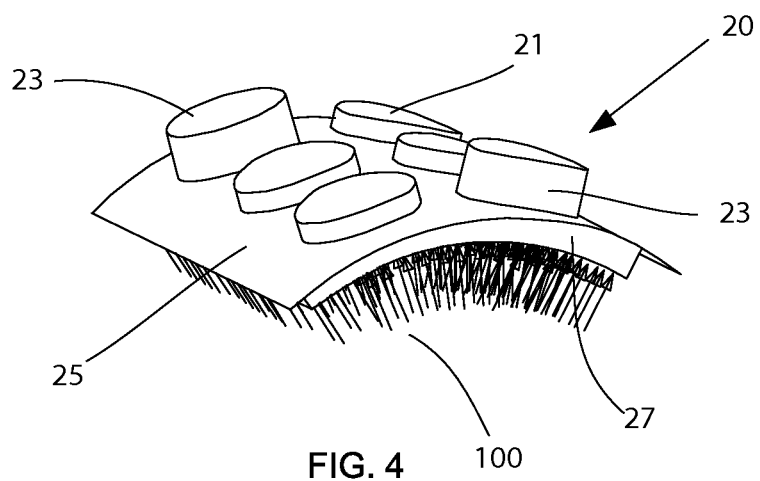
FIG. 4 is a perspective view of the sealing member.

As shown in FIG. 4, the sealing member 20 is molded or otherwise formed with an arcuate shaped base 25 and projecting outward from the base 25 and projecting outward from the base 25 are a plurality of projections 21, 23 shaped to correspondingly fit into the passageways 14 of the diffuser 10. In the preferred embodiment two or more of the projections 23 are diagonally opposed and shown extending further than projections 21. These projections 23 can be used to secure the sealing member 20 tightly to the diffuser 10 as shown in FIG. 1 the projections 23 can be heat staked or ultrasonically welded to the diffuser opening 12.

As further illustrated in FIG. 4, the gas inflation pressure is demonstrated by the arrows 100 radially striking the inside surface 27 of the sealing member 20. When assembled to the diffuser 10 the base 25 is fully supported by the diffuser 10 along the inner surface 11 except at the sealed passages 12. The sealing member 20 is designed to withstand this pressure and temperature without rupturing or losing seal integrity. Nevertheless, the sealing member 20 is also designed to be easily and rapidly consumed when exposed to fire. The flames generated by fire greatly exceed the temperatures generated by the ignited propellant 31 inside the inflator 30. This difference in temperature and the fact the flames can rapidly consume the sealing member 20 has enabled the sealing member 20 to rapidly disappear exposing the sealed openings 12 and thus providing a thrust neutral or balanced thrust to be established in the event of exposure to fire. To accomplish this, the total cumulative area of the openings 12 must approximate the open area of the passageway 14 in the discharge channel portion 10A of the diffuser 10, preferably the opposing areas are substantially equal. As shown, the diffuser 10 is preferably made of metal of a metal alloy capable of withstanding the heat and pressures exposed during use and in the event of a fire. Metals such as steel or aluminum are generally sufficient.

The sealing member 20 similarly must have a strength exceeding the normal use pressures and temperatures, but must be easily and rapidly consumed when exposed to flames in the event of a fire. Thermoplastic or elastomeric materials can satisfy this condition. The sealing member 20 has a yield strength, an ultimate strength and a percent elongation set to exceed the inflation pressure and temperatures of the ignited inflator 30 in normal use of inflating an airbag. The sealing member 20 when assembled into the diffuser 10 preferably has a yield strength of 33 MPa, ultimate strength of 35 MPa and percent elongation of 50 percent. The sealing member 20 can withstand the maximum inflation pressure and maximum temperature generated by the normally ignited inflator 30 without losing seal integrity in the absence of exposure to external flames or fire related temperatures which are adapted to consume the sealing member 20 exposing the sealed passages 12. The sealing member 20 when assembled into the diffuser 10 preferably can withstand 2600 psi at 90 degrees C. The sealing member 20 material can be preferably made from DELRIN 100 NC010, an acetal material.

While the preferred invention shows the thrust balancing feature for shipping can be integrally built into the diffuser 10, it must be appreciated the diffuser 10 can be substituted with a simple endcap if so desired.

Figure 5:
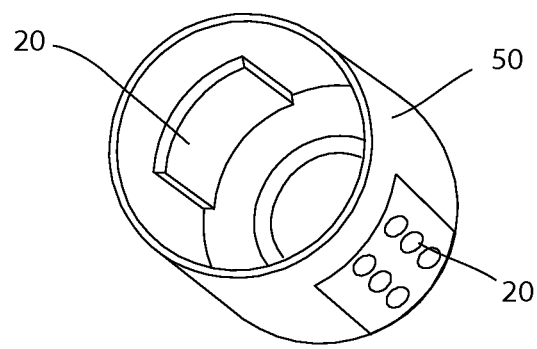
FIG. 5 is perspective view of an alternative construction showing an endcap of the present invention.

In FIG. 5 an alternative embodiment is shown wherein an endcap 50 has a pair of opposing sealing members 20. The two opposing sealing members 20 when exposed to flame create the described zero thrust or thrust neutral condition. The endcap is a desirable alternative in applications wherein the airbag inflator does not use a diffuser. This and various other modifications employing the flame consumable sealing member 20 are considered within the scope of the appended claims.

Figure 6:
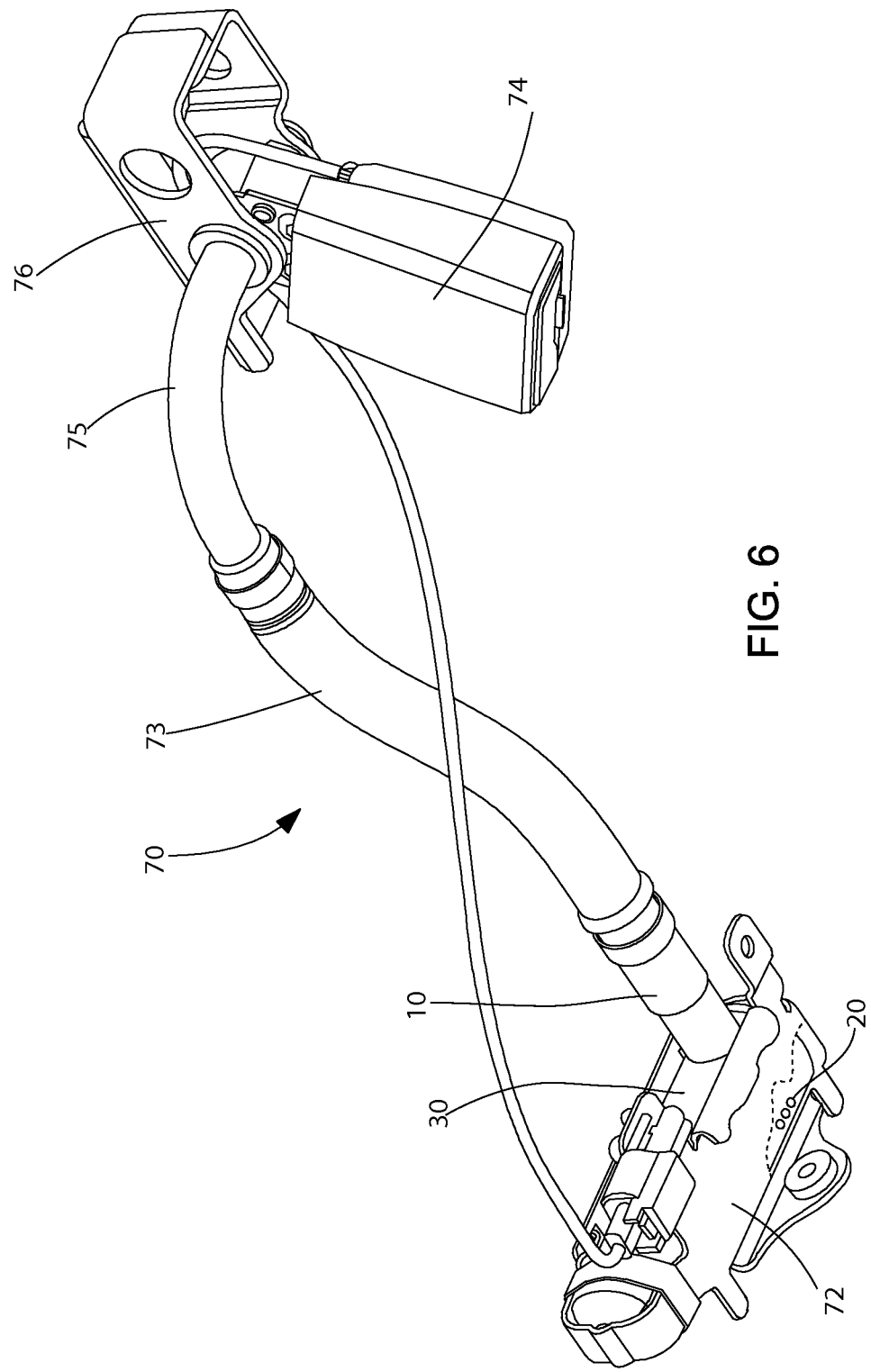
FIG. 6 is a view of the present invention inflator with a flame consumable sealing member in the diffuser shown in a side curtain airbag application.
Figure 7:
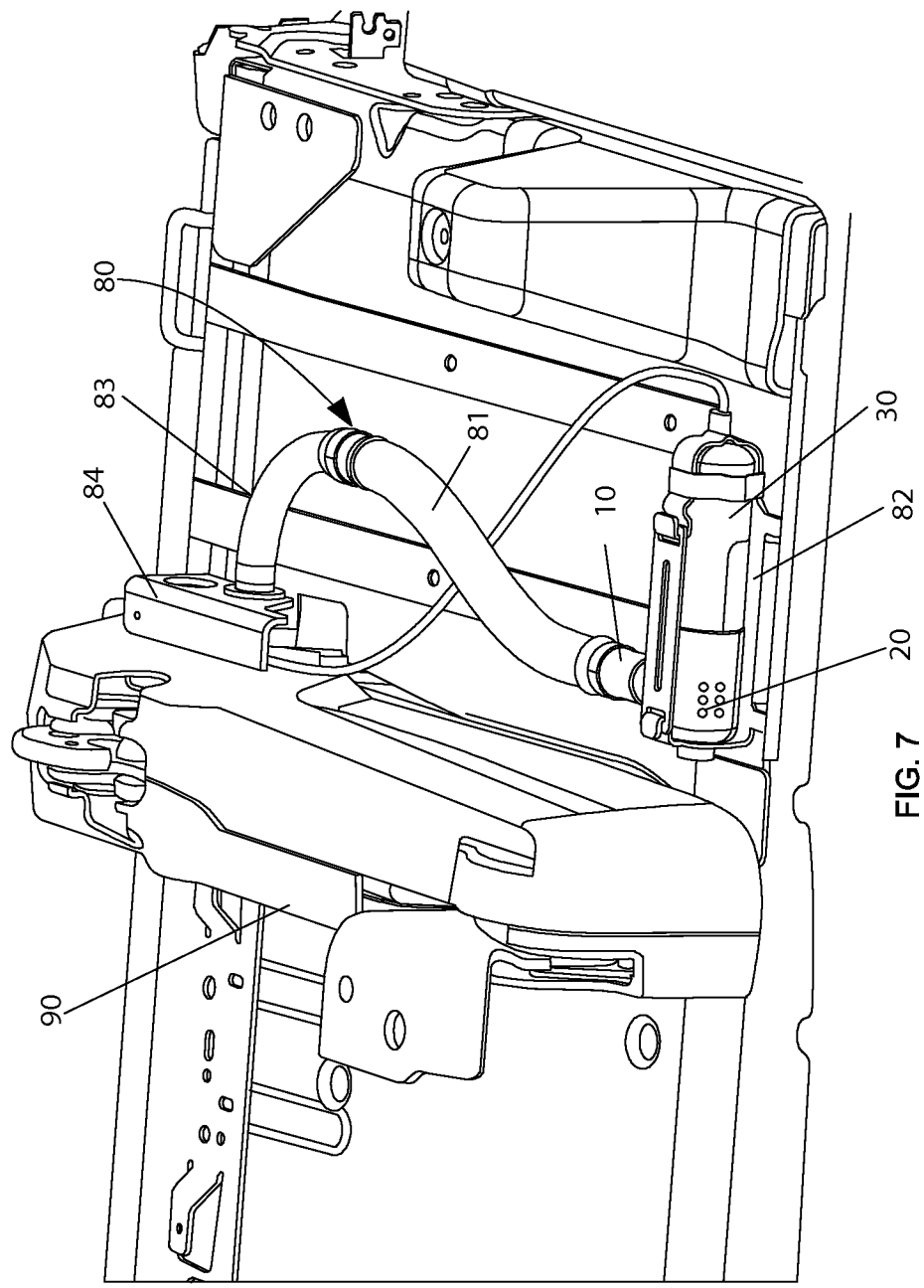
FIG. 7 is a second view of the present invention inflator with a flame consumable sealing member in the diffuser used in a vehicle seat for connection to an inflatable seatbelt.

With reference to FIGS. 6 and 7, the present invention inflator 30 with a diffuser 10 having the sealing member 20 is shown. The FIG. 6 depicts the inflator 30 mounted in a bracket assembly 72 with a tube or hose 73 connected to the diffuser 10 and extending to an assembly with a curtain airbag module 74 attached to a bracket 76 with a fill tube 75 connected to hose or tube 73. This results in an assembly 70 that is pre-manufactured at a facility and shipped for later assembly into a vehicle.

With reference to FIG. 7, the inflator 30 with a diffuser 10 having a sealing member 20 is shown as an inflation assembly 80 for an inflatable seat belt. That assembly 80 includes the inflator 30 mounted in a bracket 82 with the diffuser 10 connected to a tube or hose 81 that extends to a fill tube 83 and secondary seat bracket 84. The assembly 80 is adapted to be connected to an inflatable seat belt (not shown). The entire assembly 80 is pre-assembled and shipped to a vehicle manufacturing facility for attachment to seat frame 90 as shown. The inflator 30 when assembled and shipped needs the thrust neutral feature provided by the diffuser 10 with a flame consumable sealing member 20.

As shown, the present invention provides a thrust neutral feature in a unique way to insure safe transport, but additionally in the event of a car or vehicle fire the sealing member 20 can also safely provide this thrust neutral feature. It being understood that in the event of a crash preceding a fire, the inflator 30 will already be activated and the airbag properly deployed before the sealing member 20 is consumed. This provides a beneficial fail safe feature that insures the airbags always deploy as designed without having the flame consumable sealing member 20 interfering with deployment.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An inflator for producing inflation gas from a propellant comprises:
   a housing for storing the propellant;
   a diffuser for attachment to the inflator housing, the diffuser having a cylindrical inlet for attachment to a discharge end of the inflator and having a cylindrical discharge portion having an opening or passageway orthogonal to an axis of the inflator for passing inflation gas upon ignition of the propellant and a plurality of sealed passages oriented opposite to the opening or passageway, the generated gases are directed into the inlet end of the diffuser along an inlet channel and turned along the passageway to inflate an airbag;
   a sealing member is attached internally along an internal surface of the diffuser covering the sealed passages, the sealing member being consumed when exposed to an open flame thereby opening the sealed passages to vent inflation gases opposite the opposed opening or passageway to create a thrust neutral exhaust upon an inadvertent ignition of the propellant due to exposure to fire and wherein the plurality of sealed passages have an area relative to the area of the opposed opening or passageway of the diffuser balanced in size to ensure thrust neutrality.

2. The inflator for producing inflation gas from a propellant of claim 1 wherein the sealed passages are four or more openings in the diffuser.

3. The inflator for producing inflation gas from a propellant of claim 2 wherein the sealed openings are one of circular, square, rectangular, triangular holes or rectangular slots or any combination of these shapes covered by the sealing member.

4. The inflator for producing inflation gas from a propellant of claim 1 wherein the sealing member is made of a thermo plastic or elastomeric material.

5. The inflator for producing inflation gas from a propellant of claim 4 wherein the sealing member material is an acetal material.

6. The inflator for producing inflation gas from a propellant of claim 1 wherein the material from which the sealing member is made is consumed by exposure to flame.

7. The inflator for producing inflation gas from a propellant of claim 6 wherein the sealing member has a yield strength, an ultimate strength and a percent elongation set to exceed the inflation pressure and temperatures of the ignited inflator in normal use of inflating an airbag.

8. The inflator for producing inflation gas from a propellant of claim 7 wherein the sealing member when assembled into the diffuser has a yield strength of 33 MPa, ultimate strength of 35 MPa and percent elongation of 50 percent.

9. The inflator for producing inflation gas from a propellant of claim 7 wherein the sealing member has a plurality of short cylindrical projections adapted to plug the sealed passages.

10. The inflator for producing inflation gas from a propellant of claim 9 wherein two or more of the projections are used to secure the sealing member to the diffuser.

11. The inflator for producing inflation gas from a propellant of claim 10 wherein the two or more projections extending through the openings of the diffuser are heat staked or ultrasonically welded onto the diffuser to secure the sealing member.

12. The inflator for producing inflation gas from a propellant of claim 6 wherein the sealing member can withstand the maximum inflation pressure and maximum temperature generated by the normally ignited inflator without losing seal integrity in the absence of exposure to external flames or fire related temperatures which are adapted to consume the sealing member exposing the sealed passages.

13. The inflator for producing inflation gas from a propellant of claim 12 wherein the sealing member when assembled into the diffuser can withstand 2600 psi at 90 degrees C.

14. The inflator for producing inflation gas from a propellant of claim 1 wherein the diffuser is made of metal.

15. The inflator for producing inflation gas from a propellant of claim 14 wherein the diffuser has a circular cross section and the sealing member is attached internally along an arcuate segment of an internal surface of the diffuser.

* * * * *